US012230435B2

(12) United States Patent
Tahara et al.

(10) Patent No.: US 12,230,435 B2
(45) Date of Patent: Feb. 18, 2025

(54) COIL COMPONENT

(71) Applicant: SUMIDA CORPORATION, Tokyo (JP)

(72) Inventors: Yoshiyuki Tahara, Natori (JP); Juichi Oki, Natori (JP)

(73) Assignee: SUMIDA CORPORATION (JP)

( * ) Notice: Subject to any disclaimer, the term of this patent is extended or adjusted under 35 U.S.C. 154(b) by 627 days.

(21) Appl. No.: 17/567,948

(22) Filed: Jan. 4, 2022

(65) Prior Publication Data

US 2022/0238272 A1 Jul. 28, 2022

(30) Foreign Application Priority Data

Jan. 28, 2021 (JP) ................................ 2021-011704

(51) Int. Cl.
*H01F 27/29* (2006.01)
*H01F 27/02* (2006.01)
*H01F 27/26* (2006.01)

(52) U.S. Cl.
CPC ........... *H01F 27/292* (2013.01); *H01F 27/02* (2013.01); *H01F 27/266* (2013.01)

(58) Field of Classification Search
CPC ....... H01F 27/292; H01F 27/02; H01F 27/266
See application file for complete search history.

(56) References Cited

U.S. PATENT DOCUMENTS

2013/0154780 A1* 6/2013 Yamada .................. H01F 27/29 336/175
2018/0012699 A1* 1/2018 Arimitsu ................. H01F 27/24
2023/0395294 A1* 12/2023 Otsubo ................... H01F 17/04

FOREIGN PATENT DOCUMENTS

JP 2000-151058 A 5/2000
JP 2005-142459 A 6/2005
JP 2007-81228 A 3/2007
JP 2007-273739 A 10/2007
JP 2008-160001 A 7/2008
JP 2009266954 A * 11/2009
JP 2017045758 A * 3/2017 ............. H01F 27/24

(Continued)

OTHER PUBLICATIONS

Extended European Search Report issued for the corresponding European Pat. Application No. 22150166.1; dated Jul. 1, 2022 (total 9 pages).

(Continued)

*Primary Examiner* — Malcolm Barnes
(74) *Attorney, Agent, or Firm* — Harness, Dickey & Pierce, P.L.C.

(57) ABSTRACT

A coil component includes a core body, a coil, and a metal terminal. The core body has a mounting surface, an upper surface having a recess, and a side surface. The coil has an embedded part embedded in the core body, and a protruding part protruding from the core body. The metal terminal is electrically connected to the first protruding part of the coil. The first metal terminal has a first plate arranged along the side surface, a second plate connected to an upper end of the first plate and arranged along the upper surface, and a third plate connected to a lower end of the first plate and arranged along the mounting surface. The second plate in the recess has a first arc-shaped part. The recess has a second arc-shaped part. The second arc-shaped part extends along a contour of the first arc-shaped part.

20 Claims, 14 Drawing Sheets

(56) References Cited

FOREIGN PATENT DOCUMENTS

| | | | |
|---|---|---|---|
| JP | 2018-006676 | A | 1/2018 |
| WO | 2008-069022 | A1 | 6/2008 |

OTHER PUBLICATIONS

Office Action issued in the corresponding Japanese Patent Application No. 2021-011704; mailed on Sep. 3, 2024 (total 8 pages).

* cited by examiner

COIL COMPONENT

CROSS-REFERENCE TO RELATED APPLICATIONS

This application claims priority to Japanese Patent Application No. 2021-011704 filed Jan. 28, 2021 which is hereby expressly incorporated by reference herein in its entirety.

BACKGROUND

1. Technical Field

The present application relates to a coil component.

2. Related Art

For instance, there is a coil component that is described in Japanese Patent Publication Number 2007-273739.

The coil component that is described in Japanese Patent Publication Number 2007-273739 has a core molding (a core mold or a molded core), a coil, and a metal terminal. Specifically, the core molding is formed of a magnetic substance material. The coil has an embedded part that is embedded into the core molding and a protruding part that protrudes from the core molding. Further, the metal terminal is electrically connected to the protruding part. The core molding has a mounting surface, an upper surface, and a side surface. Specifically, the upper surface faces the opposite direction as the mounting surface. The side surface is orthogonal to the mounting surface and the upper surface. The metal terminal has a first planar part, a second planar part, and a third planar part. Specifically, the first planar part is arranged along the side surface of the core molding. The second planar part is connected to an upper end of the first planar part and is arranged along the upper surface of the core molding. Further, the third planar part is connected to a lower end of the first planar part and is arranged along the mounting surface of the core molding. A recessed part is formed in the upper surface of the core molding. The second planar part of the metal terminal is arranged at the recessed part.

The coil components explained above may be subjected to a vacuum and held by a mounter that has a suction nozzle during, for example, a mounting process.

According to the investigation and experiments of the inventors of the present application, there is room for improvement in the configuration of the coil component that is described in Japanese Patent Publication Number 2007-273739 from the view point of the mounter performing the suction more stably.

SUMMARY

The present application attempts to solve the above problem and achieve the above improvement. An object of the present application is to provide a coil component that has a configuration that enables a mounter to perform a suction more stably.

According to one aspect of the present application, a coil component includes a core body, a coil, and a metal terminal. The core body is formed of a magnetic material. The core body has a mounting surface, an upper surface, the upper surface and the mounting surface being outwardly opposite to each other, and a first side surface joining (crossing) the mounting surface and the upper surface. The coil has an embedded part embedded in the core body, and a first protruding part protruding from the core body. The metal terminal is electrically connected to the first protruding part of the coil. The metal terminal has a first plate arranged along the first side surface of the core body, a second plate continuously connected to an upper end of the first plate and arranged along the upper surface of the core body, and a third plate continuously connected to a lower end of the first plate and arranged along the mounting surface of the core body. Further, a leading edge of the second plate is recessed toward the upper end of the first plate to form a first arc-shaped part. The upper surface of the core body has a first recess in which the second plate is arranged. The first recess has a second arc-shaped part at a portion facing the first arc-shaped part. The second arc-shaped part extends along a contour of the first arc-shaped part.

According to the present application, a suction by a mounter can be performed more stably.

DESCRIPTION OF EXEMPLARY EMBODIMENTS

Figure 1:
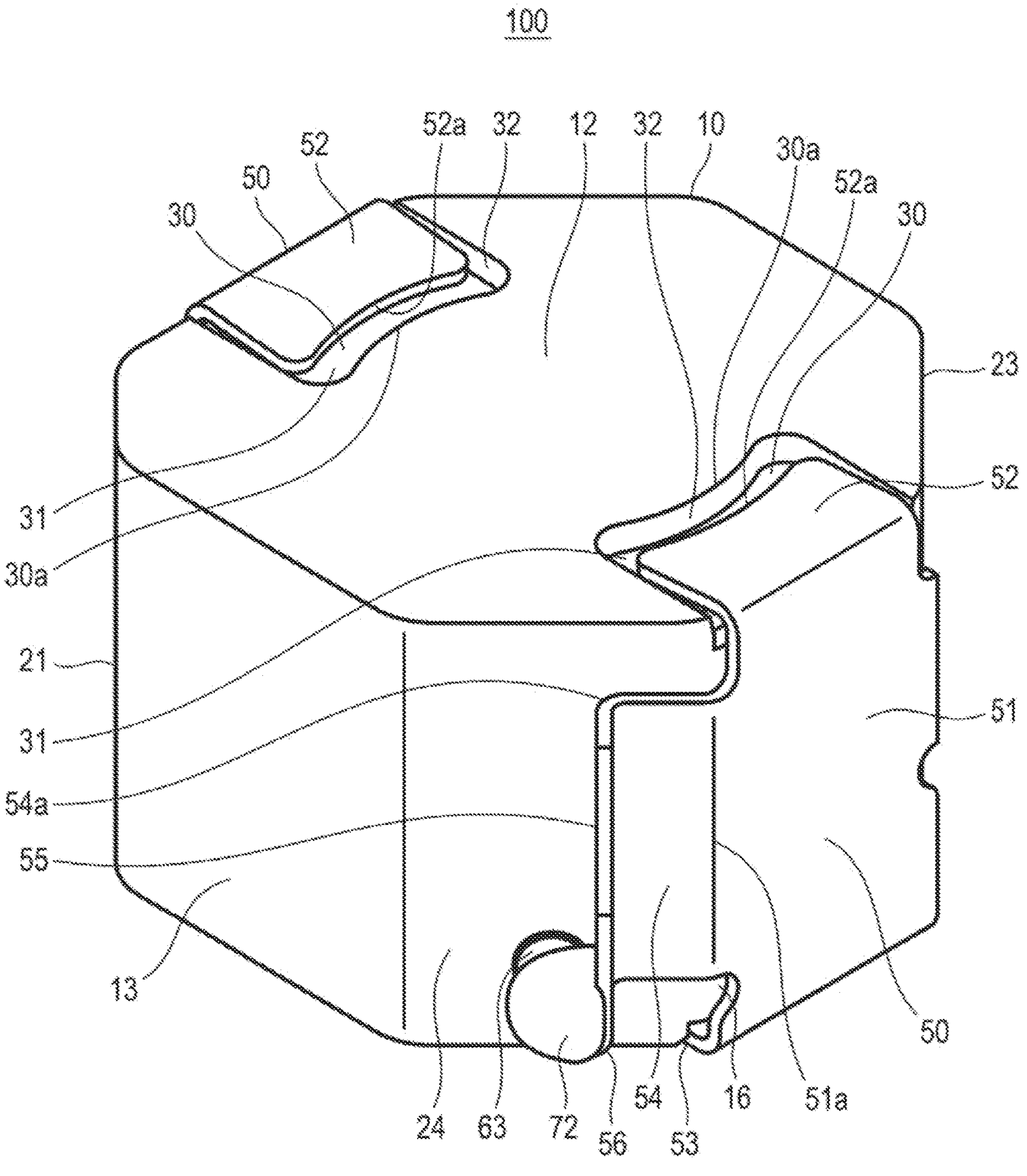
FIG. 1 is a perspective view (a diagram that shows a front surface and a right side surface) that shows a coil component according to embodiments of the present application.
Figure 2:
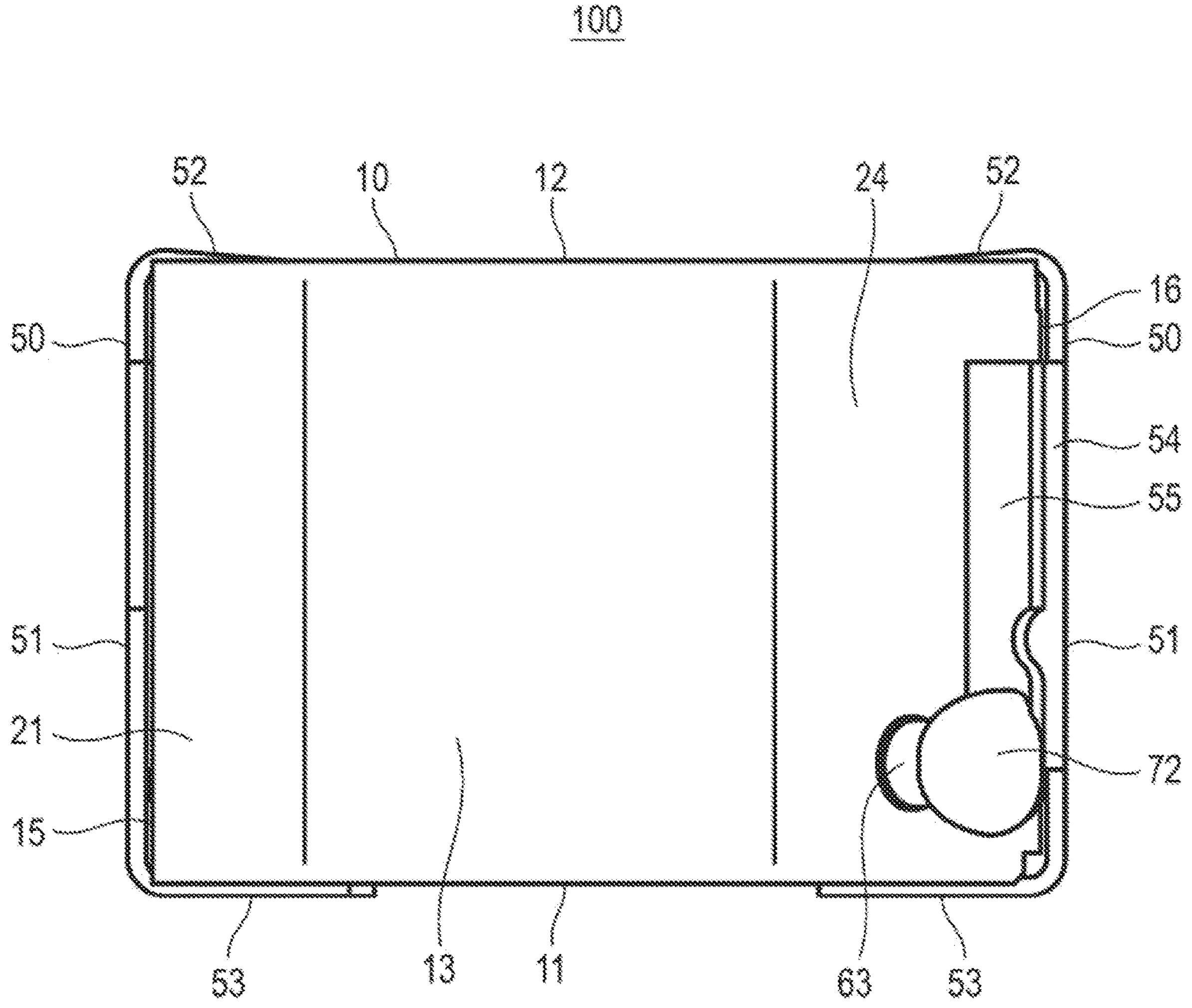
FIG. 2 is a front view that shows the coil component according to the embodiments of the present application.
Figure 3:
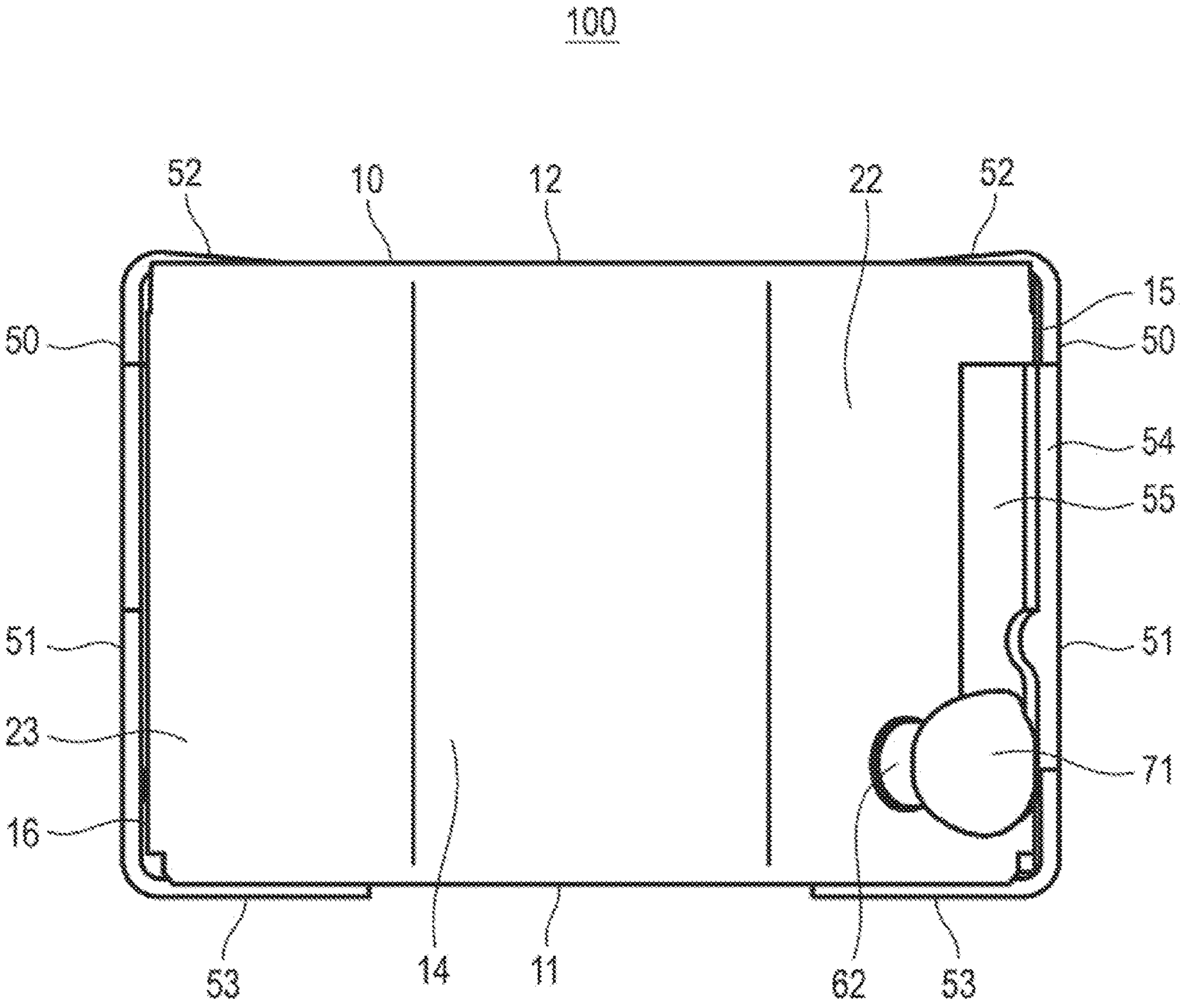
FIG. 3 is a rear view that shows the coil component according to the embodiments of the present application.

Embodiments according to the present application are explained below with reference to FIGS. 1-14. In regards to the embodiments, redundant explanations with respect to the same configurations are omitted but the same reference numerals are used for labeling in the drawings.

As shown in any drawing among FIGS. 1-14, a coil component 100 according to the embodiments of the present application has a core body 10 (alternately, a core, a core molding, a core mold, or a molded core), a coil 60, and a metal terminal(s) 50. Specifically, the core body 10 is formed of (made of or includes) a magnetic substance material (magnetic material). The coil 60 has an embedded part 61 that is embedded in the core body 10 (for instance, shown in FIGS. 8A and 9) and a protruding part(s) (a first protruding part 62 and a second protruding part 63, for instance, shown in FIG. 8A) that protrudes from the core body 10. Further, the metal terminal 50 is electrically connected to the protruding part of the coil 60.

The core body 10 has a mounting surface 11 (for instance, shown in FIG. 7), an upper surface 12, and a side surface(s). Specifically, the upper surface 12 faces an opposite side to the mounting surface 11. In other words, the mounting surface 11 and the upper surface 12 are outwardly opposite to each other. The side surfaces join (cross) (or are orthogonal to) the mounting surface 11 and the upper surface 12. For instance, the side surfaces are a front surface 13, a rear surface 14, a left side surface 15, a right side surface 16, a front left surface 21, a rear left surface 22, a rear right surface 23, and a front right surface 24.

The metal terminal 50 has a first planar part (first plate) 51, a second planar part (second plate) 52, and a third planar part (third plate) 53. Specifically, the first planar part 51 is arranged along the side surface of the core body 10. The second planar part 52 is continuously connected to an upper end (edge) of the first planar part 51 and is arranged along the upper surface 12 of the core body 10. Further, the third planar part 53 is continuously connected to a lower end (edge) of the first planar part 51 and is arranged along the mounting surface 11 of the core body 10. The first, second, and third planar parts 51, 52, and 53 are integrally formed. In other words, a monolithic member (monolithic metal plate) configures the first, second, and third planar parts 51, 52, and 53.

Figure 8A:
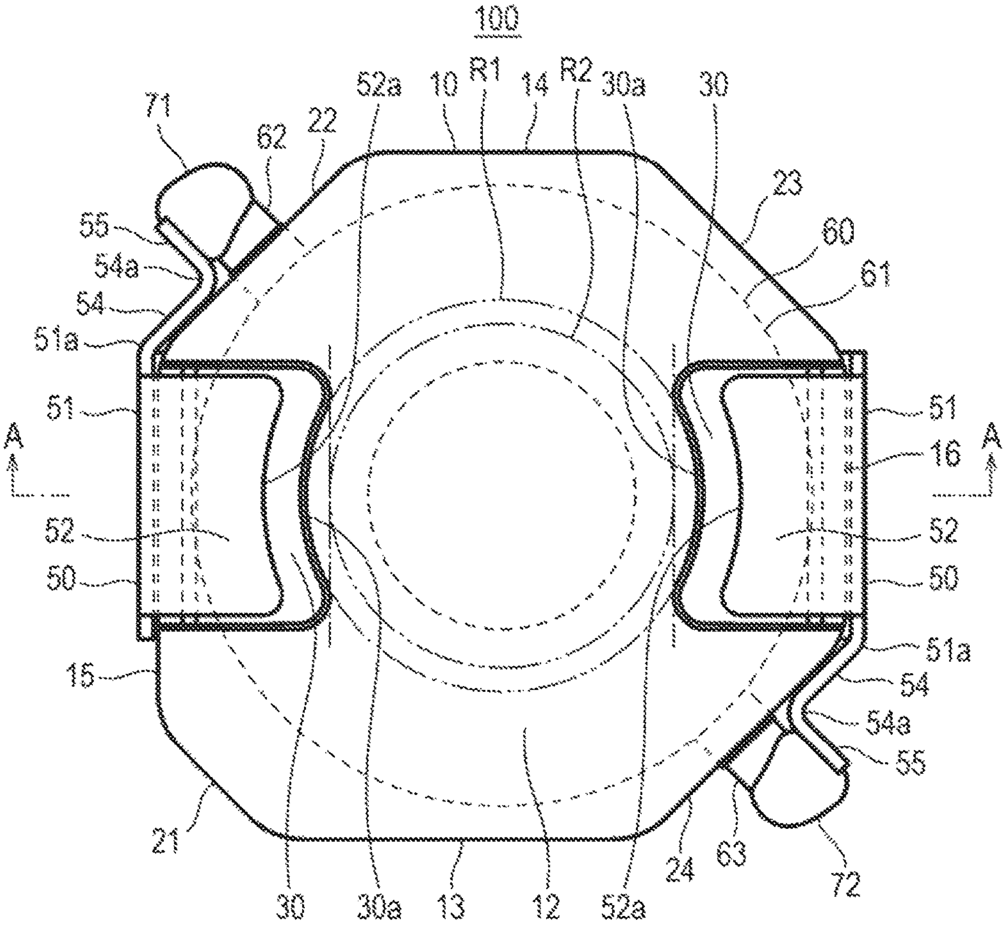
FIG. 8A is a plan (top) perspective view that shows the coil component according to the embodiments of the present application.
Figure 8B:
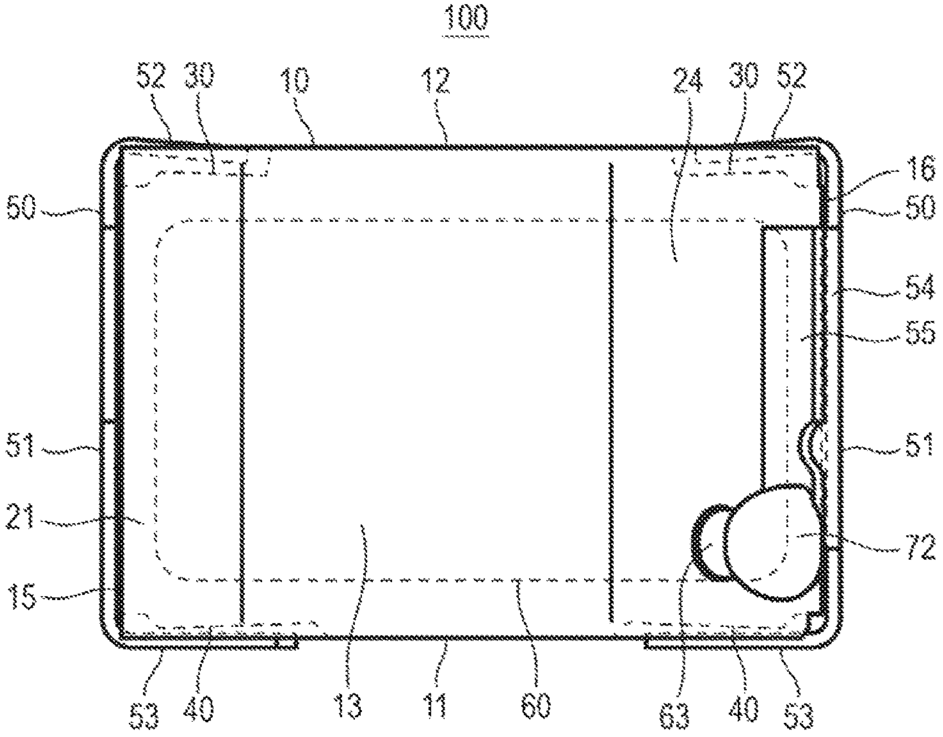
FIG. 8B is a front perspective view that shows the coil component according to the embodiments of the present application.

A leading edge (tip edge or forefront edge) of the second planar part 52 is a first recess-shaped part (first arc-shaped part or first arc part) 52*a* (for instance, shown in FIG. 8A). Specifically, the first recess-shaped part 52*a* is hollowed (recessed or depressed) toward an upper end (edge) side of the first planar part 51 and the leading edge of the first recess-shaped part 52*a* is formed to be in a planar shape (arc-planar shape). The upper edge side of the first planar part 51 is a base end side of the second planar part 52. A recessed part 30 is formed in the upper surface 12 of the core body 10. The second planar part 52 is arranged in the recessed part 30 of the upper surface 12. A second recess-shaped part (second arc-shaped part or second arc part) 30*a* (for instance, shown in FIG. 8A) of the recessed part 30 corresponds to or is formed along the first recess-shaped part 52*a*. The second recess-shaped part 30*a* is formed to be in a planar shape (arc-planar shape) along the planar shape of the first recess-shaped part 52*a*. In other words, the second recess-shaped part 30*a* of the recessed part 30 extends along a configuration (shape) of the first recess-shaped part 52*a* as shown in FIGS. 1, 6, 8A, and 10.

According to the embodiment of the present application, because the first recess-shaped part 52*a* and the second recess-shaped part 30*a* are provided, the area of a region that can be sucked (subject to a vacuum) by a suction nozzle of a mounter (not shown) can be sufficiently secured and ensured on the upper surface 12. Note that because a suction nozzle (a suction area of the suction nozzle) is generally in a circular shape (such as "R2" shown in FIG. 8A), the sucked region is efficiently secured on the upper surface 12 of the core body 10. As a result, the suction of the coil component 100 by the mounter can be performed more stably.

The coil component 100 according to the embodiments of the present application is explained in detail below. The core body 10 is formed by a compression molding of powders including a magnetic substance material. During the process of the compression molding, the embedded part 61 of the coil 60 is embedded into the core body 10.

The shape of the core body 10 is not particularly limited. However, for instance, the core body 10 has the mounting surface 11, the upper surface 12, and a plurality of side surfaces that are respectively orthogonal to the mounting surface 11 and the upper surface 12. The mounting surface 11 is formed to be flat except for, for instance, a pair of second recessed parts 40 described below. The upper surface 12 is formed to be flat except for, for instance, a pair of (first) recessed parts 30. Further, the upper surface 12 is arranged in parallel to the mounting surface 11.

For instance, the side surfaces of the core body 10 has the front surface 13, the rear surface 14, the left side surface 15, and the right side surface 16. Specifically, the rear surface 14 is arranged in parallel to the front surface 13 and faces the opposite side to the front surface 13. The left side surface 15 is orthogonal to the front surface 13 and the rear surface 14. Further, the right side surface 16 is arranged in parallel to the left side surface 15 and faces the opposite side to the left side surface 15.

The core body 10 has, for instance, the front left surface 21, the rear left surface 22, the rear right surface 23, and the front right surface 24 as the side surfaces. Specifically, the front left surface 21 is arranged between the front surface 13 and the left side surface 15 and connects the front surface 13 with the left side surface 15. The rear left surface 22 is arranged between the left side surface 15 and the rear surface 14 and connects the left side surface 15 with the rear surface 14. The rear right surface 23 is arranged between the rear surface 14 and the right side surface 16 and connects the rear surface 14 with the right side surface 16. Further, the front right surface 24 is arranged between the right side surface 16 and the front surface 13 and connects the right side surface 16 with the front surface 13. The front left surface 21 is, for instance, tilted relative to each of the front surface 13 and the left side surface 15 at an angle of 135 degrees. The rear left surface 22 is, for instance, tilted relative to each of the left side surface 15 and the rear surface 14 at an angle of 135 degrees. The rear right surface 23 is, for instance, tilted relative to each of the rear surface 14 and the right side surface 16 at an angle of 135 degrees. Further, the front right surface 24 is, for instance, tilted relative to each of the right side surface 16 and the front surface 13 at an angle of 135 degrees. For instance, all of the rear left surface 22, the rear right surface 23, and the front right surface 24 have the same shapes and the same sizes (the same areas). However, with respect to a width dimension, the front left surface 21 is smaller than the rear left surface 22, the rear right surface 23, and the front right surface 24 as shown in FIG. 8A. With respect to an area, the front left surface 21 is smaller than the rear left surface 22, the rear right surface 23, and the front right surface 24.

Each of the front surface 13, the rear surface 14, the left side surface 15, the right side surface 16, the front left surface 21, the rear left surface 22, the rear right surface 23, and the front right surface 24 is, for instance, formed to be flat.

In the present embodiment, a pair of left and right (first) recessed parts 30 is formed on the upper surface 12. A pair of left and right second recessed parts 40 is formed on the mounting surface 11.

As an example, the coil 60 is configured by a single round wire. In this case, the coil 60 has the embedded part 61 that is configured by winding the (single) round wire and a pair of protruding parts (the first protruding part 62 and the second protruding part 63) that protrude toward an outside in the radial direction from the embedded part 61. An axis direction of the coil 60 is in the vertical direction. The first protruding part 62 is configured by one end of the (single) round wire. The second protruding part 63 is configured by the other end of the (single) round wire. The first protruding part 62 and the second protruding part 63 horizontally protrude from the embedded part 61. For instance, the first protruding part 62 and the second protruding part 63 mutually protrude in the opposite directions from the embedded part 61. The first protruding part 62 horizontally protrudes from, for instance, the lower part of the rear left surface 22 of the core body 10. The second protruding part 63 horizontally protrudes from, for instance, the lower part of the front right surface 24 of the core body 10. For instance, the protruding direction of the first protruding part 62 protruded from the rear left surface 22 is orthogonal to the rear left surface 22. The protruding direction of the second protruding part 63 protruded from the front right surface 24 is orthogonal to the front right surface 24.

Further, the coil 60 is not limited to be configured by the single round wire according to the embodiments of the present application. However, the coil 60 may be, for instance, an edgewise coil that is configured by winding a flat wire.

Figure 14:
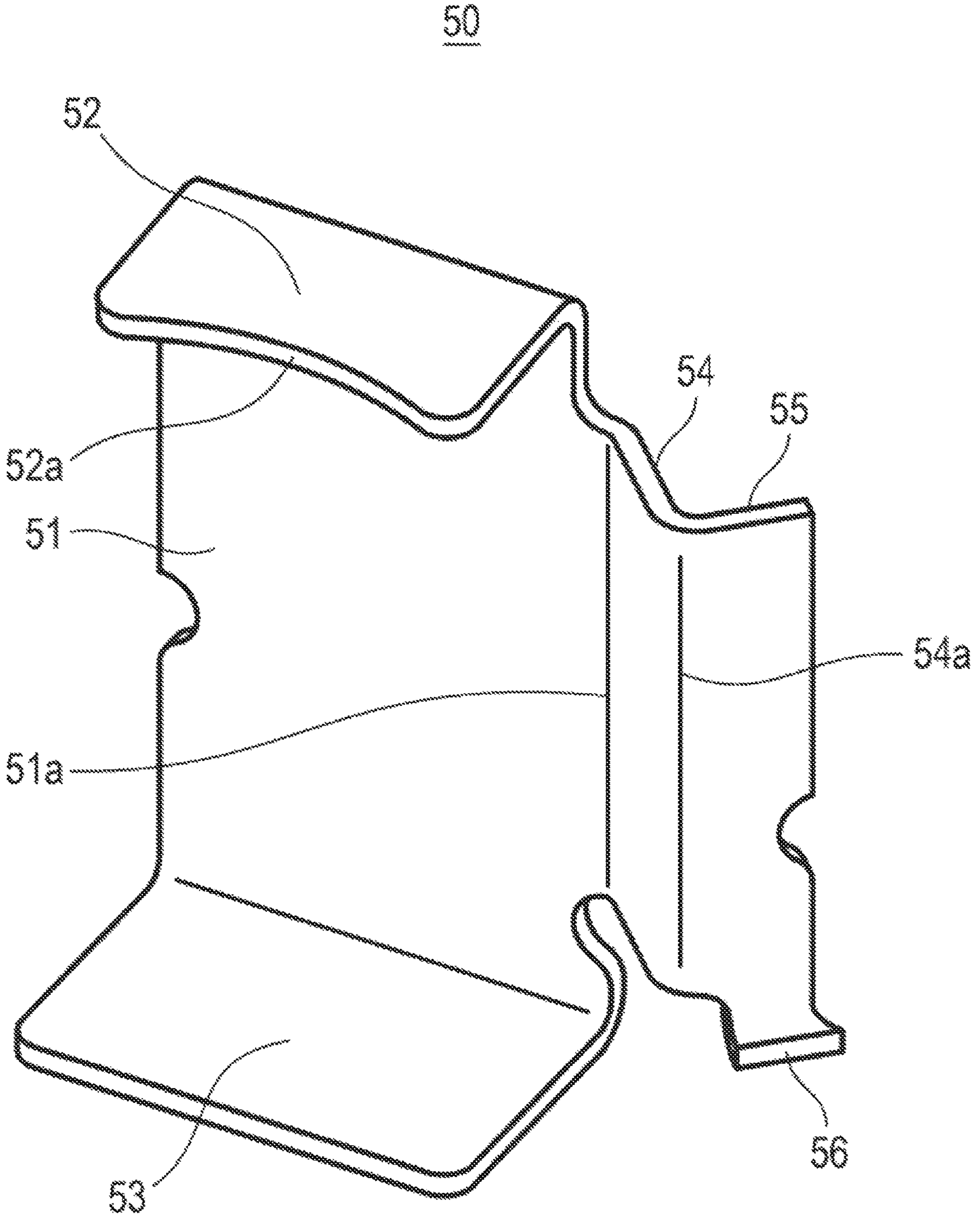
FIG. 14 is a perspective view that shows a metal terminal of the coil component according to the embodiments of the present application.

As shown in FIG. 14, the metal terminal 50 is, for instance, configured by a folding process of a single metal plate.

The metal terminal 50 has the first planar part (first plate) 51, the second planar part (second plate) 52, and the third planar part (third plate) 53 that are respectively formed to be a flat-shaped plate. The second planar part 52 is continuously connected to the upper end of the first planar part 51 and is substantially orthogonal to the first planar part 51. The third planar part 53 is continuously connected to the lower end of the first planar part 51 and is substantially orthogonal to the first planar part 51. The second planar part 52 and the third planar part 53 are located at opposite positions to each other and are substantially parallel to each other (refer to FIG. 9).

Figure 4:
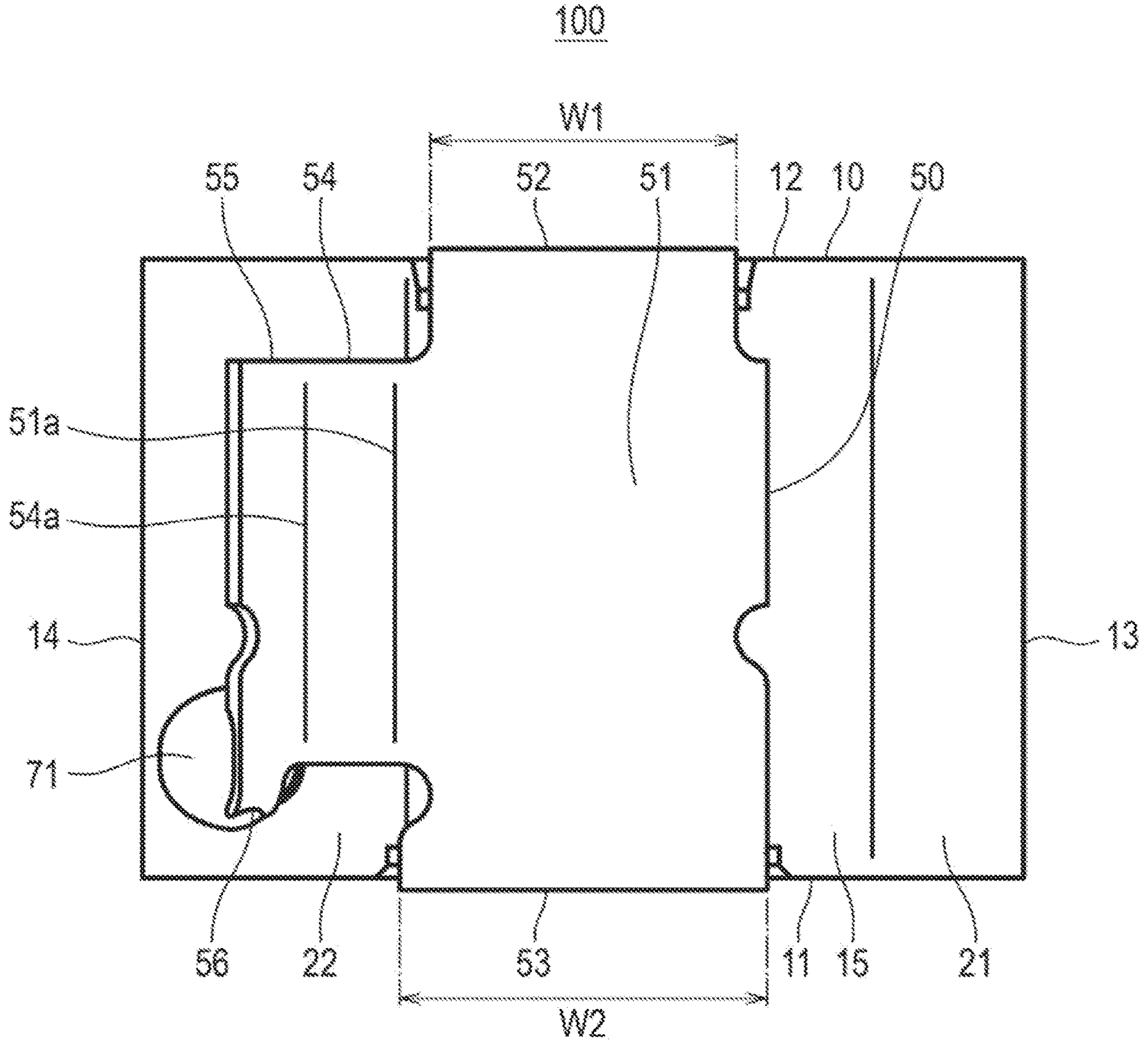
FIG. 4 is a left side view that shows the coil component according to the embodiments of the present application.
Figure 5:
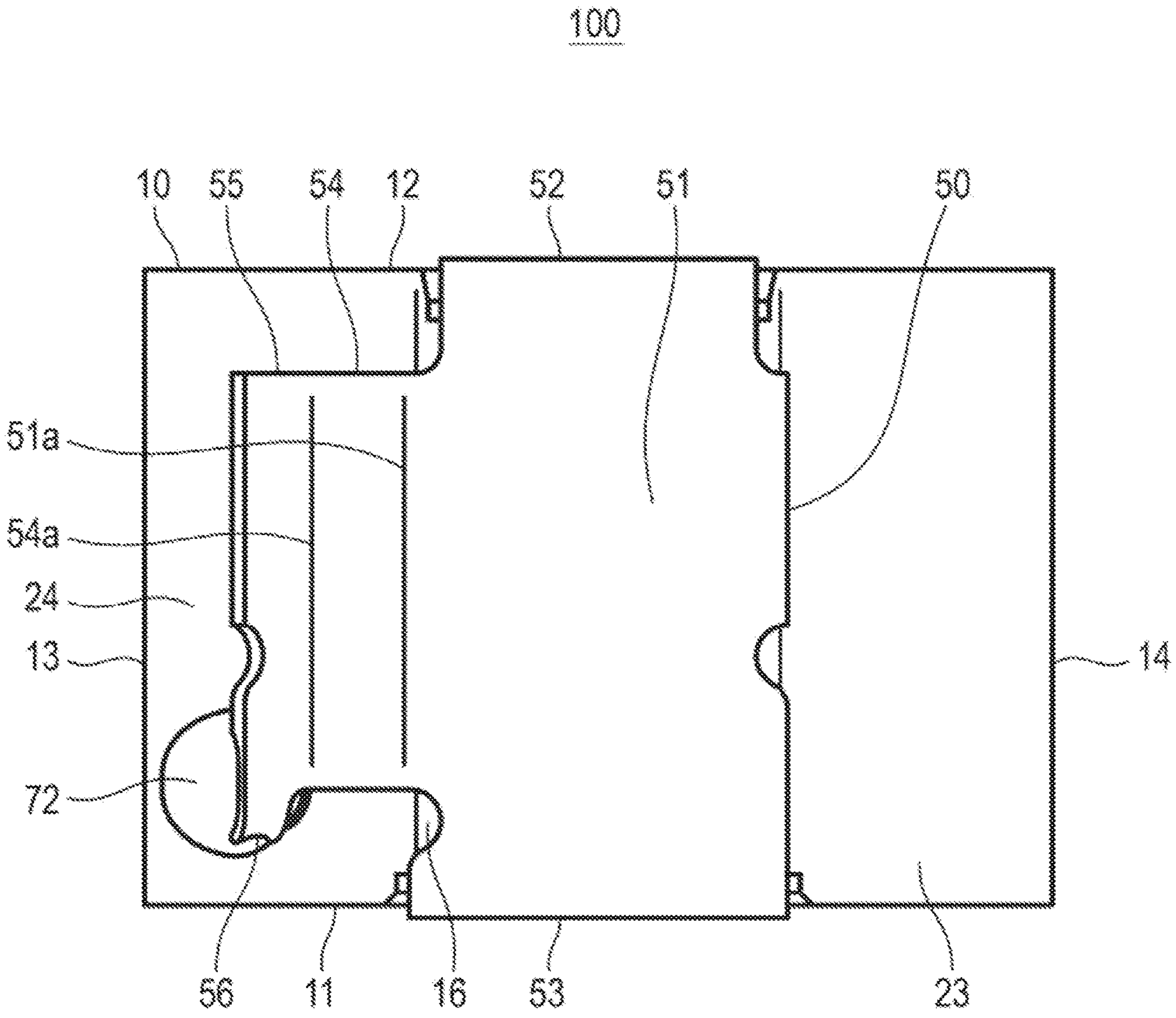
FIG. 5 is a right side view that shows the coil component according to the embodiments of the present application.

As shown in FIGS. 4 and 5, the first planar part(s) 51 is, for instance, formed to be in a rectangular shape that is vertically long.

Figure 6:
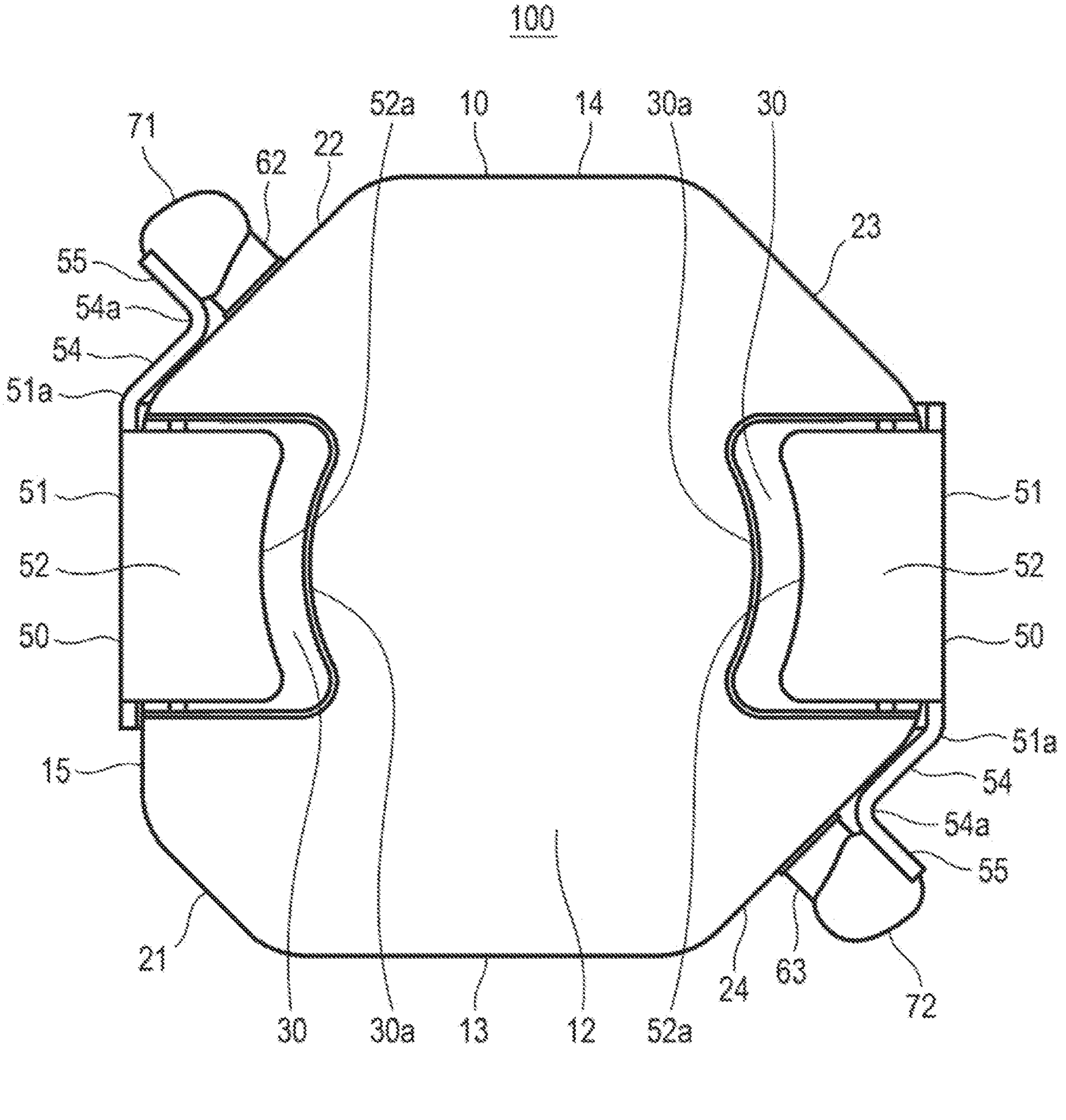
FIG. 6 is a plan (top) view that shows the coil component according to the embodiments of the present application.

As shown in FIG. 6, the second planar part(s) 52 is, for instance, formed to be in a rectangular shape that is longer in a front-rear direction than in a right-left direction in the plan view. However, the leading edge(s) of the second planar part(s) 52 is the first recess-shaped part(s) (first arc-shaped part or first arc part) 52*a* as explained above. Further, it is preferred that a lateral width dimension (in the sight-left direction) of the second planar part(s) 52 is, for instance, more than two times of a plate thickness of the metal terminal 50. It is also preferred that the lateral width dimension (in the sight-left direction) of the second planar part(s) 52 is, for instance, more than three times of the plate thickness of the metal terminal 50. As a result of setting the dimensions of the second planar part 52 as explained above, the bending (folding) process of the metal terminal 50 to form the second planar part 52 can be stably performed.

Figure 7:
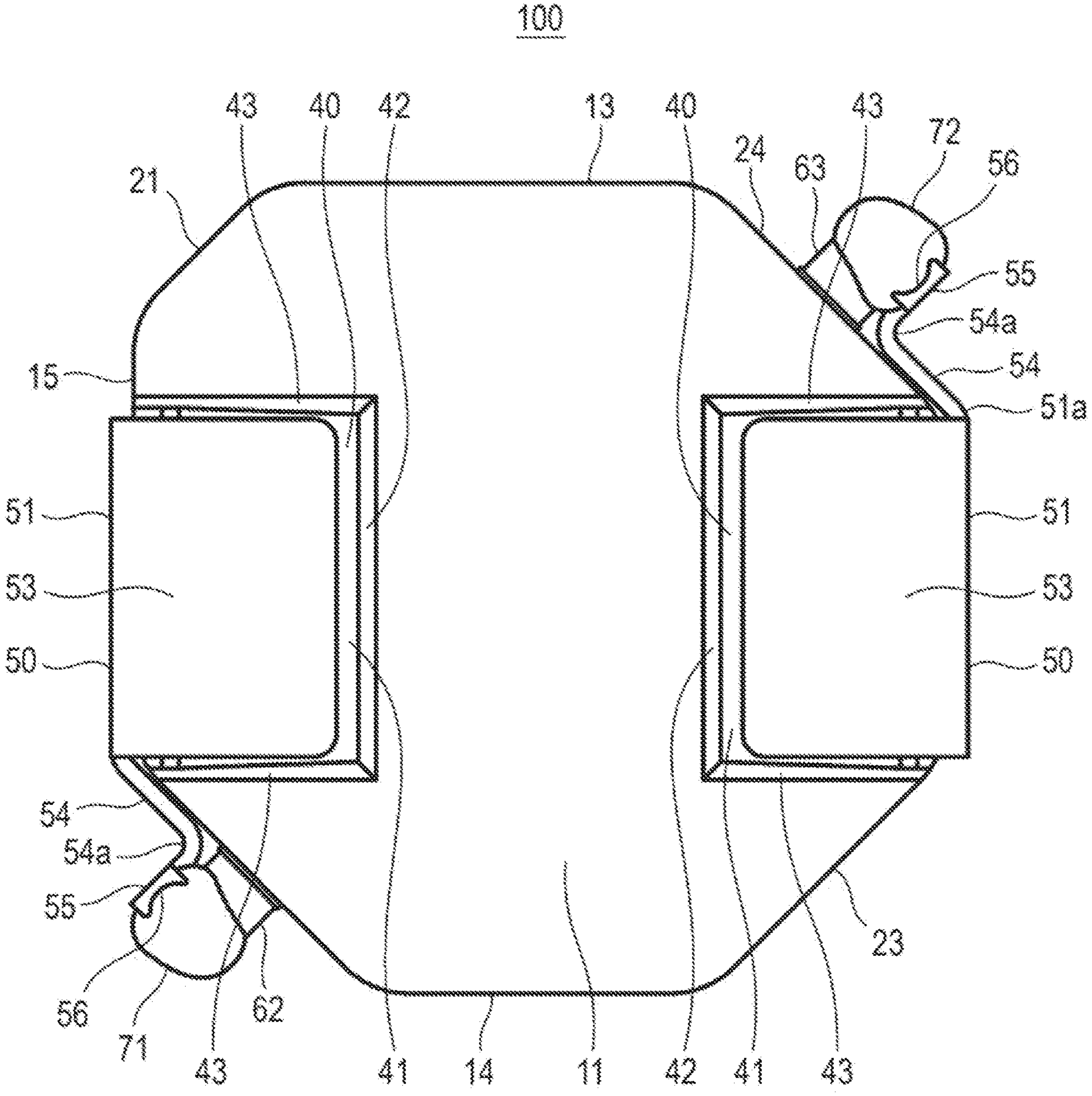
FIG. 7 is a bottom view that shows the coil component according to the embodiments of the present application.

As shown in FIG. 7, the third planar part(s) 53 is, for instance, formed to be in a rectangular shape that is longer in the front-rear direction than in the right-left direction in the plan view.

Further, as shown in FIGS. 4, 5, and 14, the metal terminal 50 has a fourth planar part (fourth plate) 54 and a fifth planar part (fifth plate) 55. Specifically, the fourth planar part 54 is continuously connected to a side edge 51*a* of the first planar part 51 and joins (crosses) the first planar part 51. The fifth planar part 55 is continuously connected to a leading edge (tip edge or forefront edge) 54*a* of the fourth planar part 54 and joins (crosses) the fourth planar part 54. Because the fourth planar part 54 and the fifth planar part 55 are formed by the bending (folding) process of the metal terminal 50, the side edge 51*a* and the leasing edge 54*a* are folds or ridges of the metal terminal 50. The fourth planar part 54 and the fifth planar part 55 are also respectively formed to be a flat-shaped plate. As shown in such as FIGS. 1-5, each of the fourth planar part 54 and the fifth planar part 55 is, for instance, formed to be in a rectangular shape that is vertically long.

In the plan view, an angle between the first planar part 51 and the fourth planar part 54 is, for instance, set to be 135 degrees (refer to such as FIG. 8A). In the plan view, an angle between the fourth planar part 54 and the fifth planar part 55 is, for instance, set to be 90 degrees (refer to such as FIG. 8A).

The first planar part 51, the fourth planar part 54, and the fifth planar part 55 are respectively vertically arranged or extend in the vertical (up and down) direction. The second planar part 52 and the third planar part 53 are respectively substantially horizontally arranged or substantially extend in the horizontal direction.

A welded piece (welded strip) 56 is formed at a lower end part of the fifth planar part 55. The welded piece(s) 56 is welded to the protruding part(s) (the first protruding part 62 and the second protruding part 63) of the coil 60 (refer to such as FIG. 7).

In the present embodiment, the coil component 100 has a pair of left and right metal terminals (first and second metal terminals) 50. For instance, the pair of metal terminals 50 are mutually formed to be in the same shapes and the same sizes.

The first planar part 51 of one (the left side) of the metal terminals 50 is arranged along the left side surface 15. The second planar part 52 of this metal terminal 50 is arranged at or in the recessed part 30 on the left side. The third planar part 53 of this metal terminal 50 is arranged at or in the second recessed part 40 on the left side. The fourth planar part 54 of this metal terminal 50 on the left side is, for instance, arranged along the rear left surface 22. Further, the fifth planar part 55 of this metal terminal 50 substantially vertically raises relative to (substantially uprises with respect to or substantially stands from) the rear left surface 22.

The first planar part 51 of the other (the right side) of the metal terminals 50 is arranged along the right side surface 16. The second planar part 52 of this metal terminal 50 is arranged at or in the recessed part 30 on the right side. The third planar part 53 of this metal terminal 50 is arranged at or in the second recessed part 40 on the right side. The fourth planar part 54 of this metal terminal 50 on the right side is, for instance, arranged along the front right surface 24. Further, the fifth planar part 55 of this metal terminal 50 substantially vertically raises relative to (substantially uprises with respect to or substantially stands from) the front right surface 24.

As explained above, the second recessed parts 40 at or in which the third planar parts 53 are arranged are formed on the mounting surface 11.

Further, the fourth planar parts 54 are arranged along the side surfaces of the core body 10. The fifth planar parts 55 raise relative to the side surfaces of the core body 10.

Further, because the fifth planar parts 55 raise from the side surfaces of the core body 10, the satisfactory or excellent heat dissipation from the fifth planar parts 55 can be realized. It is preferred that the vertical dimension (length) of each of the fifth planar parts 55 is half or more of the vertical dimension (length or height) of the core body 10. It is more preferred that the vertical dimension (length) of each of the fifth planar parts 55 is two thirds or more of the vertical dimension (length or height) of the core body 10.

Figure 9:
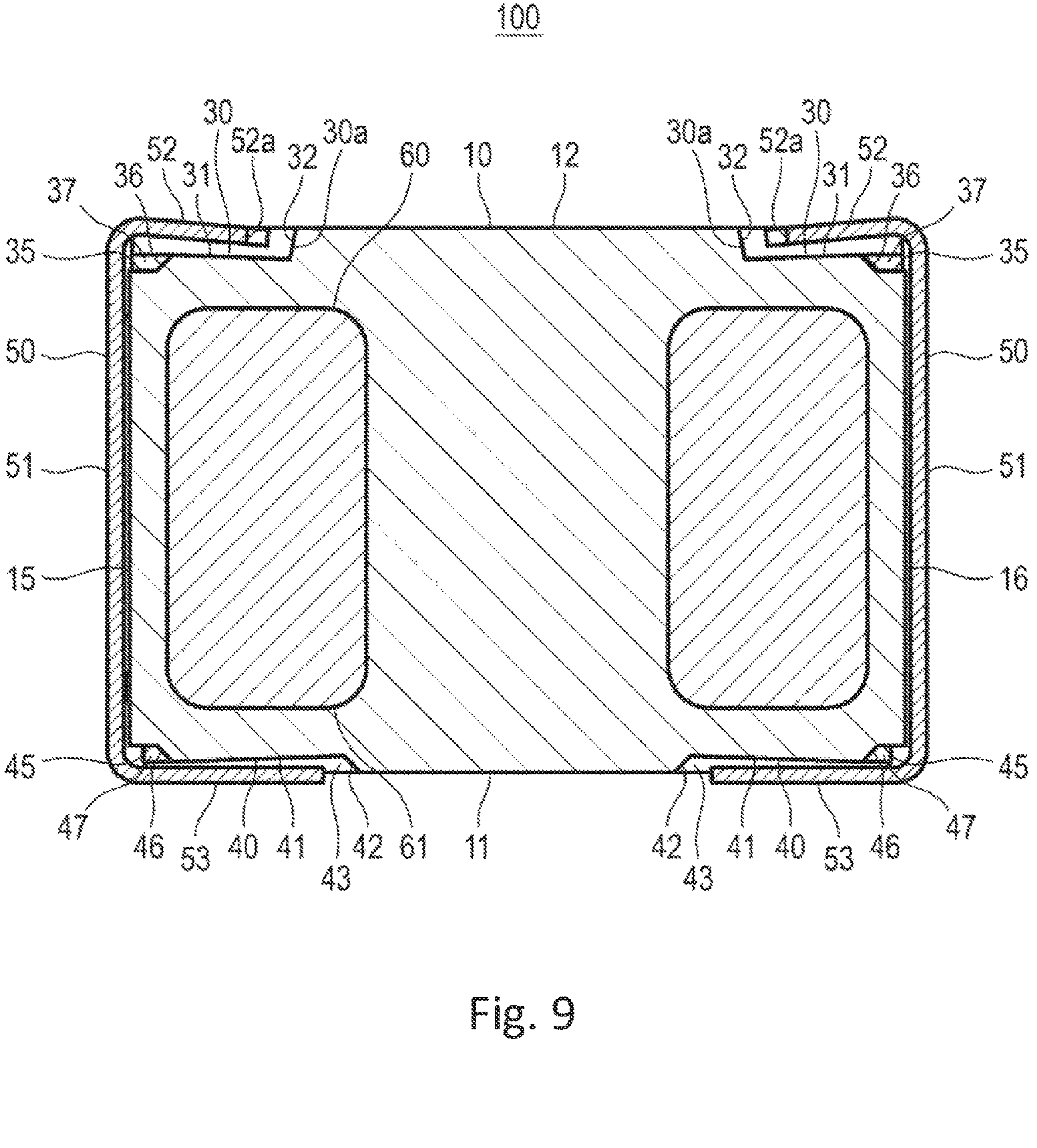
FIG. 9 is a cross-sectional view (a front cross-sectional view) along the line A-A shown in FIG. 8A according to the embodiments of the present application.
Figure 10:
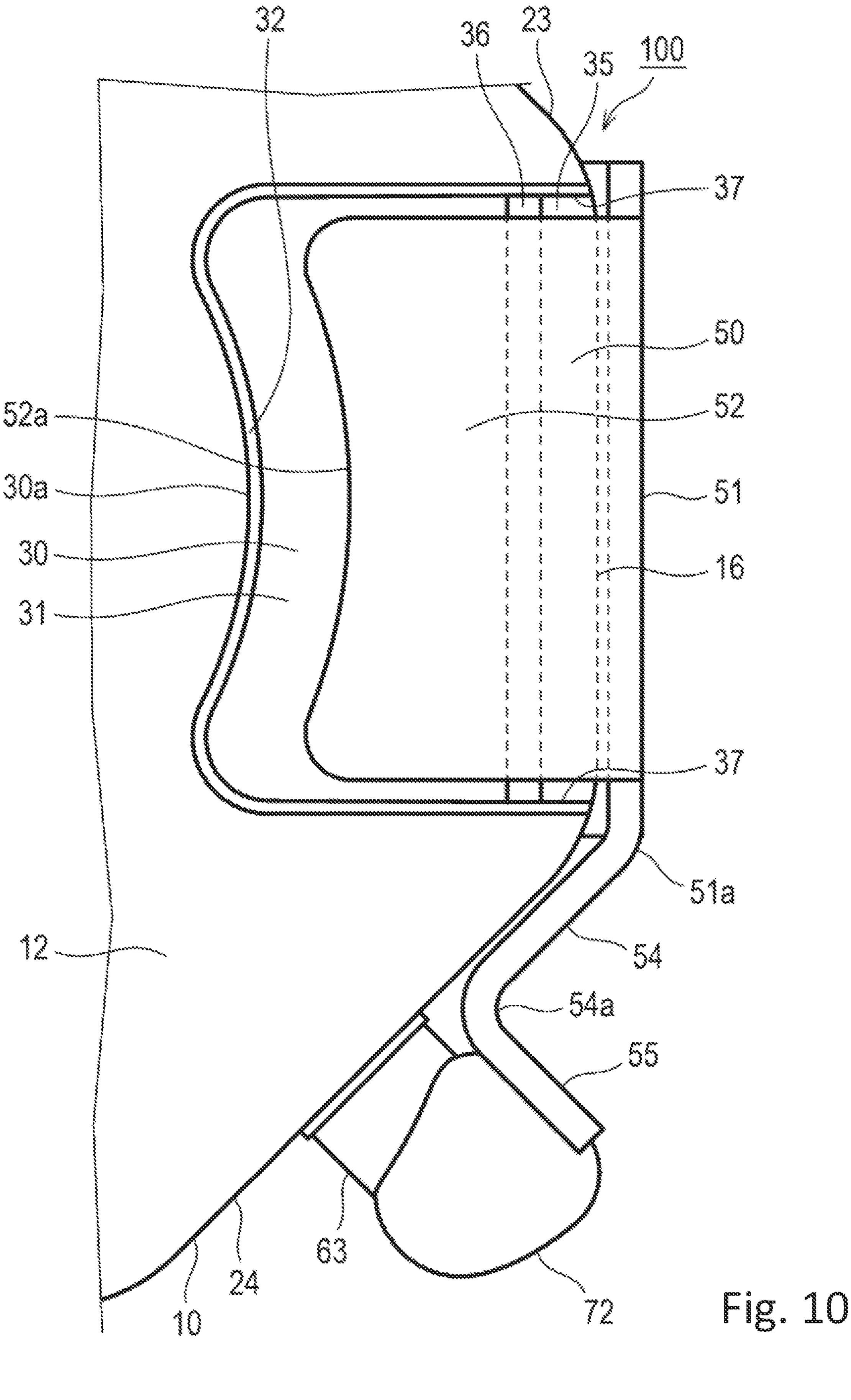
FIG. 10 is a partial enlarged plan (top) view that shows the coil component according to the embodiments of the present application.

For instance, the metal terminal 50 is adhered and fixed to the core body 10. For instance, as shown in FIG. 9, the first planar part 51 is in surface contact with the side surface of the core body 10 and is surface-joined to the core body 10 by an adhesive.

The welded piece 56 of the metal terminal 50 on the left side is welded to one of the protruding parts (the first protruding part 62) of the coil 60. Similarly, the welded piece 56 of the metal terminal 50 on the right side is welded to the other of the protruding parts (the second protruding part 63) of the coil 60.

For instance, the welded piece 56 and the first protruding part 62 of the metal terminal 50 on the left side are mutually welded at a first welding part 71 that is in a spherical shape. Similarly, the welded piece 56 and the second protruding part 63 of the metal terminal 50 on the right side are mutually welded at a second welding part 72 that is in a spherical shape.

Figure 11:
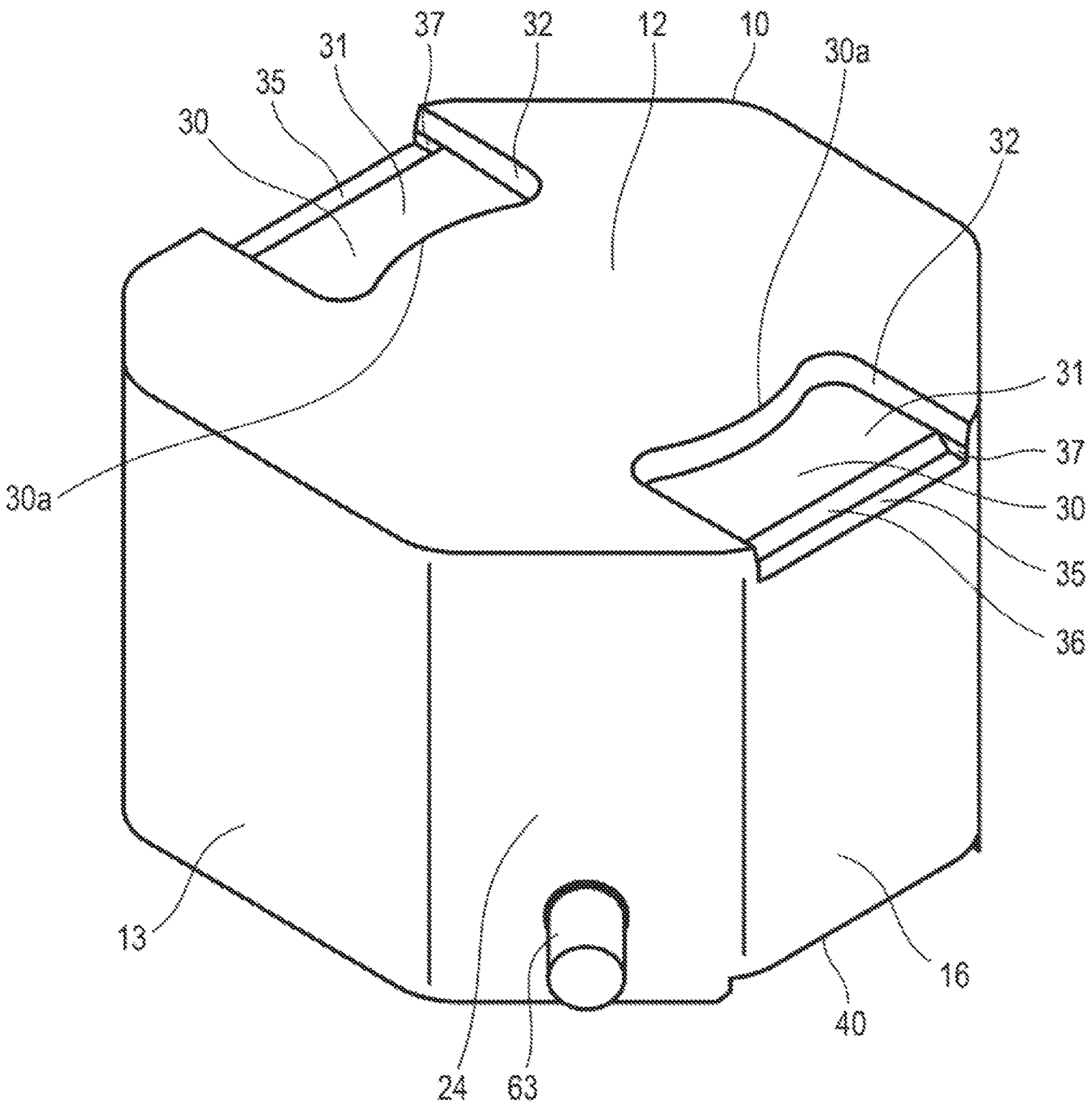
FIG. 11 is a perspective view that shows a core body (alternately, a core, a core molding, a core mold, or a molded core) and a protruding part (protrusion) of a coil of the coil component according to the embodiments of the present application.
Figure 12:
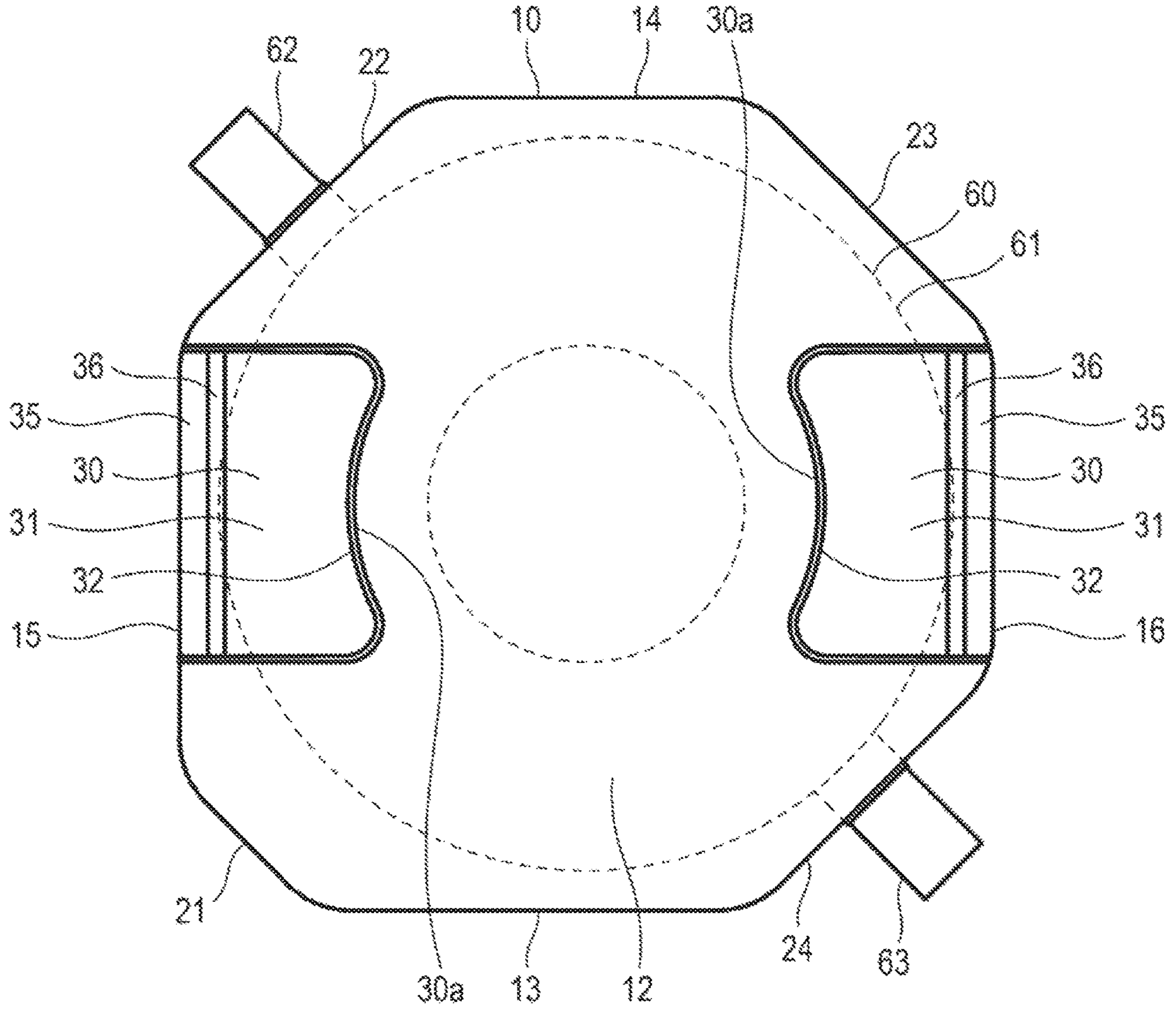
FIG. 12 is a plan (top) perspective view that shows the core body and the coil of the coil component according to the embodiments of the present application.

As shown in FIGS. 11 and 12, the recessed part 30 on the left side of the pair of left and right recessed parts 30 is arranged at the left end of the upper surface 12. The recessed part 30 on the right side is arranged at the right end of the upper surface 12.

For instance, each of the recessed parts 30 is configured with a first step 31 (a bottom surface), a first tilted (inclined) surface (wall) 32 (an upper tilted surface), a second step 35, a second tilted surface 36, and a pair of vertical surfaces (walls) 37. Specifically, the first tilted surface 32 is arranged at the peripheral edge of the recessed part 30. The second step 35 is arranged at a lower step as compared with the first step 31. Further, the second tilted surface 36 is arranged between the first step 31 and the second step 35 and is tilted downward toward the side of the second step 35 from the side of the first step 31.

The first step 31 occupies the most of the plane area of the recessed part 30. A bottom surface of the first step 31 is substantially horizontally arranged. However, in the present embodiment, the first step 31 increases in depth as it becomes far from the side surface of the core body 10.

The left edge of the first step 31 of the recessed part 30 on the left side linearly extends in the front-rear direction. Each of the front and rear edges of the first step 31 of the recessed part 30 on the left side linearly extends in the right-left direction. The second step 35 of the recessed part 30 on the left side linearly extends in the front-rear direction along the left edge of the first step 31 of the recessed part 30 on the left side, and at the same time, is substantially horizontally arranged. The left edge of the second step 35 of the recessed part 30 on the left side serves as the upper edge of the left side surface 15 at a position where the recessed part 30 on the left side is formed.

Similarly, the right edge of the first step 31 of the recessed part 30 on the right side linearly extends in the front-rear direction. Each of the front and rear edges of the first step 31 of the recessed part 30 on the right side linearly extends in the right-left direction. The second step 35 of the recessed part 30 on the right side linearly extends in the front-rear direction along the right edge of the first step 31 of the recessed part 30 on the right side, and at the same time, is substantially horizontally arranged. The right edge of the second step 35 of the recessed part 30 on the right side serves as the upper edge of the right side surface 16 at a position where the recessed part 30 on the right side is formed.

In the plan view, the second tilted surface 36 is arranged between the first step 31 and the second step 35.

The second tilted surface 36 of the recessed part 30 on the left side extends in the front-rear direction along the left edge of the first step 31 of the recessed part 30 on the left side and is tilted downward toward the left side.

The first tilted surface 32 of the recessed part 30 on the left side is continuously arranged along the right edge, the front edge, and the rear edge of this recessed part 30.

Similarly, the second tilted surface 36 of the recessed part 30 on the right side extends in the front-rear direction along the right edge of the first step 31 of the recessed part 30 on the right side and is tilted downward toward the right side.

Similarly, the first tilted surface 32 of the recessed part 30 on the right side is continuously arranged along the left edge, the front edge, and the rear edge of this recessed part 30.

Each of the first tilted surfaces 32 is tilted to a direction in which the recessed part 30 becomes smaller (narrow) toward the depth direction (downward) of each of the recessed parts 30. In other words, each of the first tilted surfaces 32 is tilted downward and inward with respect to the recessed part 30. The first tilted surface 32 works as a draft angle when the core body 10 is pulled (taken out) from a mold after being formed by a molding process.

At each of the recessed parts 30, the lower end of the first tilted surface 32 is positioned at the same height position as the bottom surface of the first step 31. The vertical surfaces 37, which are vertically arranged, are respectively arranged between both ends of the second step 35 and the second tilted surface 36 in the front-rear direction and the lower end of the first tilted surface 32.

The planar shape of the recessed part 30 corresponds to the planar shape of the second planar part 52. Each of the second planar parts 52 enters into each of the recessed parts 30.

Further, as explained above, the leading edge of the second planar part 52 of the metal terminal 50 is the first recess-shaped part 52*a*. The first recess-shaped part 52*a* is hollowed (recessed or depressed) toward the upper edge side of the first planar part 51 and is formed to be in the planar shape.

In other words, in the plan view, a right edge (the leading edge) of the second planar part 52 of the metal terminal 50 on the left side is hollowed toward the left side. A left edge (the leading edge) of the second planar part 52 of the metal terminal 50 on the right side is hollowed toward the right side. More specifically, the right edge of the second planar part 52 of the metal terminal 50 on the left side is hollowed toward the left side in a circular arc shape (in an arc shape). The left edge of the second planar part 52 of the metal terminal 50 on the right side is hollowed toward the right side in the circular arc shape (in the arc shape).

Further, both ends of the leading edge of the second planar part 52 (in the present embodiment, the front and rear ends of the right edge of the second planar part 52 on the left side and the front and rear ends of the left edge of the second planar part 52 on the right side) are respectively formed to be in a projecting circular arc shape toward the outside of the second planar part 52.

Further, with respect to the recessed part 30, the portions that correspond to both ends of the leading edge of the second planar part 52 are respectively formed to be in the circular arc shape along both ends of the leading edge of the second planar part 52. As a result, in the configuration in which the second recess-shaped part 30*a* is formed at the recessed part 30 according to the present embodiment, such as a chipping of the core body 10 can be suppressed, and at the same time, an interference of the second planar part 52 with the core body 10 can also be suppressed.

Further, as explained above, with respect to each of the recessed parts 30, the portion of the recessed parts 30 that corresponds to the first recess-shaped part 52*a* is the second recess-shaped part 30*a* that is formed to be in the planar shape along the first recess-shaped part 52*a*.

In other words, the planar shape of the right edge of the first step 31 of the recessed part 30 on the left side and the planar shape of the portion that is arranged along the right edge of the first step 31 of the first tilted surface 32 of the recessed part 30 on the left side are formed to be in the recessed shape that is hollowed toward the left side and is in a circular arc shape.

Similarly, the planar shape of the left edge of the first step 31 of the recessed part 30 on the right side and the planar shape of the portion that is arranged along the left edge of the first step 31 of the first tilted surface 32 of the recessed part 30 on the right side are formed to be in the recessed shape that is hollowed toward the right side and is in a circular arc shape.

Further, the second recess-shaped part 30*a* of the recessed part 30 on the left side and the second recess-shaped part 30*a* of the recessed part 30 on the right side are mutually arranged on the same circumference in the plan view. In other words, these (two of) second recess-shaped parts 30*a* extend along the same circumference of a circle R1 (see FIG. 8A) (are concentrically arranged) on the upper surface 12 of the core body 10 in the plan view.

As explained above, the pair of recessed parts 30 are formed in the upper surface 12. The coil 60 has the pair of protruding parts (the first protruding part 62 and the second protruding part 63). The coil component 100 has the pair of metal terminals 50. One of the pair of metal terminals 50 is electrically connected to one of the pair of protruding parts. The other of the pair of metal terminals 50 is electrically connected to the other of the pair of protruding parts. The second planar part 52 of one of the pair of metal terminals 50 is arranged at or in one of the pair of recessed parts 30. The second planar part 52 of the other of the pair of metal terminals 50 is arranged at or in the other of the pair of recessed parts 30. The second recess-shaped part 30*a* of one of the pair of recessed parts 30 and the second recess-shaped part 30*a* of the other of the pair of recessed parts 30 are mutually arranged on the same circumference in the plan view. In other words, these (two of) second recess-shaped parts 30*a* extend along the same circumference of a circle R1 (see FIG. 8A) (are concentrically arranged) on the upper surface 12 of the core body 10 in the plan view.

As a result, the circular region being surrounded by the second recess-shaped parts 30*a* of the pair of recessed parts 30 on the upper surface 12 can be excellently sucked by a suction nozzle of a mounter.

Specifically, as shown in FIG. 8A, the circular region being surrounded by two second recess-shaped parts 30*a* corresponds to the circle R1. Further, a circle R2 corresponds to, for example, a periphery of the suction nozzle of the mounter or the sucked region.

Figure 13:
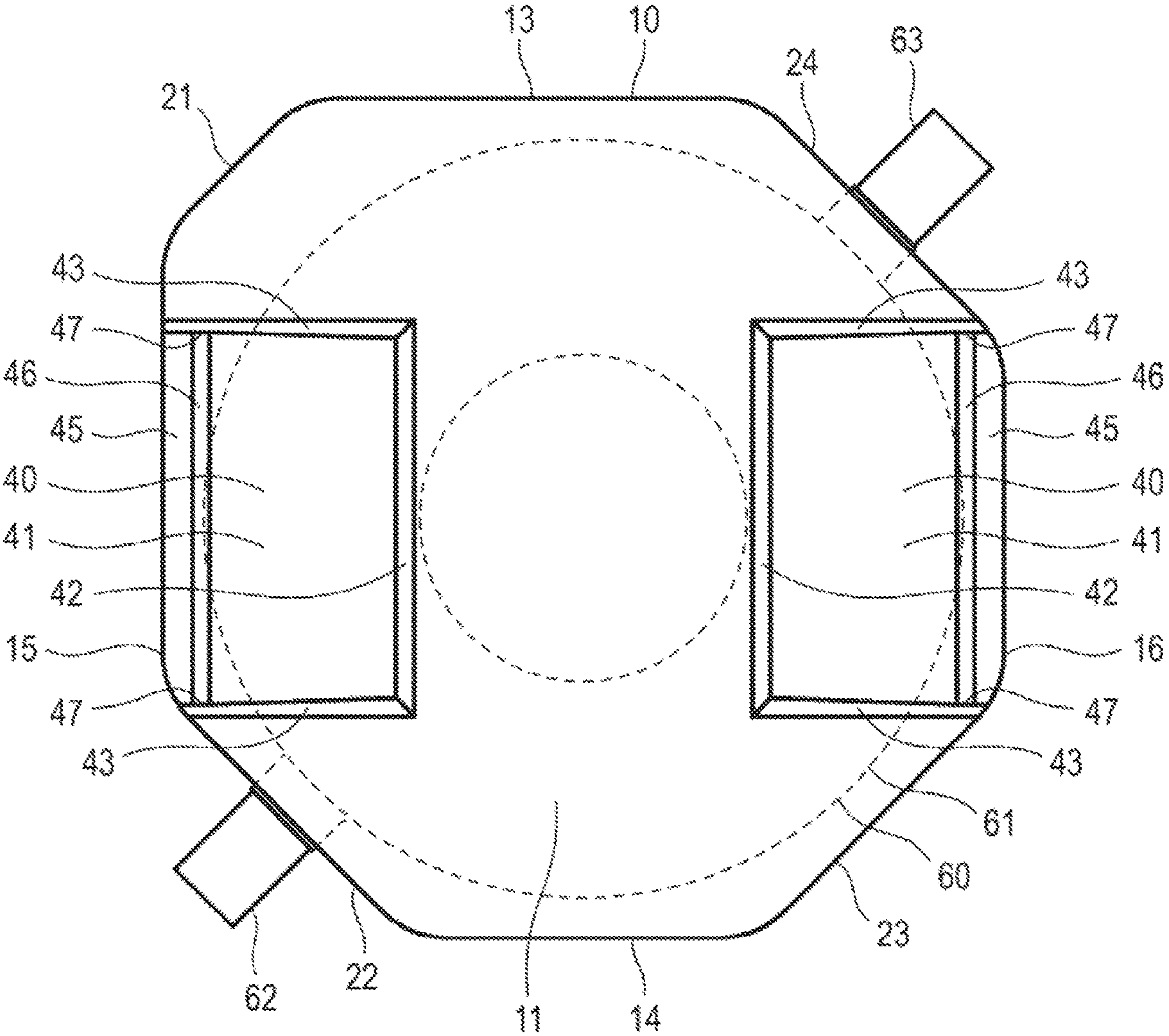
FIG. 13 is a bottom perspective view that shows the core body and the coil of the coil component according to the embodiments of the present application.

As shown in FIG. 13, the second recessed part 40 on the left side of a pair of left and right second recessed parts 40 is arranged at the left end of the mounting surface 11. The second recessed part 40 on the right side is arranged at the right end of the mounting surface 11.

For instance, each of the second recessed parts 40 is configured with a first step 41 (a bottom surface), a first tilted surface (wall) 42 (a lower tilted surface), a pair of front and rear second tilted surfaces (walls) 43 (lower tilted surfaces), a second step 45, a third tilted surface 46, and a pair of vertical surfaces (walls) 47. Specifically, the first tilted surface 42 and the pair of front and rear second tilted surfaces 43 are arranged at a peripheral edge of second recessed part 40. The second step 45 is arranged in the upward position (on the side of the upper surface 12) as compared with the first step 41. Further, the third tilted surface 46 is arranged between the first step 41 and the second step 45 and is tilted (tilted upward) toward the side of the second step 45 from the side of the first step 41.

The first step 41 occupies the most of the plane area of the second recessed part 40. A bottom surface of the first step 41 is substantially horizontally arranged. But, in the present embodiment, the first step 41 increases in depth as it becomes far from the side surface of the core body 10. However, the bottom surface of the first step 41 is not limited to the above configuration and may be arranged horizontally (to be parallel to the mounting surface 11).

Each of the left and right edges of the first step 41 of the second recessed part 40 on the left side linearly extends in the front-rear direction. Each of the front and rear edges of the first step 41 of the second recessed part 40 on the left side linearly extends in the right-left direction. The second step 45 of the second recessed part 40 on the left side linearly extends in the front-rear direction along the left edge of the first step 41 of the second recessed part 40 on the left side, and at the same time, is substantially horizontally arranged. The left edge of the second step 45 of the second recessed part 40 on the left side serves as the lower edge of the left side surface 15 at a position where the second recessed part 40 on the left side is formed.

Similarly, each of the left and right edges of the first step 41 of the second recessed part 40 on the right side linearly extends in the front-rear direction. Each of the front and rear edges of the first step 41 of the second recessed part 40 on the right side linearly extends in the right-left direction. The second step 45 of the second recessed part 40 on the right side linearly extends in the front-rear direction along the right edge of the first step 41 of the second recessed part 40 on the right side, and at the same time, is substantially horizontally arranged. The right edge of the second step 45 of the second recessed part 40 on the right side serves as the lower edge of the right side surface 16 at a position where the second recessed part 40 on the right side is formed.

In the plan view, the third tilted surface 46 is arranged between the first step 41 and the second step 45.

The third tilted surface 46 of the second recessed part 40 on the left side extends in the front-rear direction along the left edge of the first step 41 of the second recessed part 40 on the left side and is tilted upward toward the left side. The first tilted surface 42 of the second recessed part 40 on the left side extends in the front-rear direction along the right edge of this second recessed part 40. The second tilted surface 43 at the front side of the second recessed part 40 on the left side extends in the right-left direction along the front edge of the second recessed part 40 on the left side. The second tilted surface 43 at the rear side of the second recessed part 40 on the left side extends in the right-left direction along the rear edge of the second recessed part 40 on the left side.

Similarly, the third tilted surface 46 of the second recessed part 40 on the right side extends in the front-rear direction along the right edge of the first step 41 of the second recessed part 40 on the right side and is tilted upward toward the right side. The first tilted surface 42 of the second recessed part 40 on the right side extends in the front-rear direction along the left edge of this second recessed part 40. The second tilted surface 43 at the front side of the second recessed part 40 on the right side extends in the right-left direction along the front edge of the second recessed part 40 on the right side. The second tilted surface 43 at the rear side of the second recessed part 40 on the right side extends in the right-left direction along the rear edge of the second recessed part 40 on the right side.

With respect to each of the second recessed parts 40, the first tilted surface 42 and the pair of second tilted surfaces 43 are tilted to a direction in which the second recessed part 40 becomes smaller toward the depth direction (upward) of each of the second recessed parts 40. The first tilted surface 42 and the pair of second tilted surfaces 43 work as draft angles when the core body 10 is pulled (taken out) from a mold after being formed by s molding process.

At each of the second recessed parts 40, the upper end of each of the second tilted surfaces 43 is positioned at the same height position as the bottom surface of the first step 41. The vertical surfaces 47, which are vertically arranged, are respectively arranged between both ends of the second step 45 and the third tilted surface 46 in the front-rear direction and the upper ends of the second tilted surfaces 43.

The planar shape of the second recessed part 40 corresponds to the planar shape of the third planar part 53. Each of the third planar parts 53 enters into each of the second recessed parts 40.

As shown in FIG. 9, for instance, the second planar part 52 is spaced apart from the bottom surface of the recessed part 30. On the other hand, the third planar part 53 comes in contact with the bottom surface of the second recessed part 40, or alternatively, a distance between the third planar part 53 and the bottom surface of the second recessed part 40 is smaller than a distance between the second planar part 52 and the bottom surface of the recessed part 30.

As a result, since the third planar parts 53 work as mounting terminals, a position accuracy of the third planar parts 53 can be improved. In addition, as mentioned above, the interferences between the second planar parts 52 and the recessed parts 30 (the core body 10) can be suppressed.

When the metal terminal(s) 50 is attached on (is assembled to) the core body 10, for instance, the second planar part 52 is joined (caulked) by being pressed downward. The second step 35 and the second tilted surface 36 are respectively arranged at the boundary part between the upper surface 12 and the left side surface 15 and at the boundary part between the upper surface 12 and the right side surface 16. Therefore, when the metal terminal 50 is attached on (is assembled to) the core body 10 and the second planar part 52 is joined (caulked) (by being pressed downward), the interferences between the second planar parts 52 and the core body 10 can be suppressed. Further, as explained above, the first step 31 increases in depth as it becomes far from the side surface. Therefore, after the second planar part 52 is joined (caulked) to the core body 10, it is possible to suppress a case in which the second planar part 52 is detached from the recessed part 30 toward the outside. That is, it is possible to respectively suppress cases in which the second planar part 52 on the left side is detached from the recessed part 30 on the left side in the left direction and the second planar part 52 on the right side is detached from the recessed part 30 on the right side in the right direction.

Further, the second step 45 and the third tilted surface 46 are respectively arranged at the boundary part between the mounting surface 11 and the left side surface 15 and at the boundary part between the mounting surface 11 and the right side surface 16. Therefore, when the metal terminal(s) 50 is attached on (is assembled to) the core body 10, the interferences between the third planar parts 53 and the core body 10 can be suppressed.

As explained above, the first tilted surface 32 of the recessed part 30 is tilted to the direction in which the recessed part 30 becomes smaller toward the depth direction (downward) of the recessed part 30. Similarly, the first tilted surface 42 and the pair of second tilted surfaces 43 of the second recessed part 40 are tilted to the direction in which the second recessed part 40 becomes smaller toward the depth direction (upward) of the second recessed part 40.

However, in the present embodiment, the tilt angle of the first tilted surface 32 is steeper (more acute) (closer to 90 degrees) than the tilt angle of each of the first tilted surface 42 and the second tilted surfaces 43.

As explained above, the upper tilted surface (the first tilted surface 32), which is tilted to the direction in which the recessed part 30 becomes smaller toward the depth direction of the recessed part 30, is formed on the peripheral edge of the recessed part 30. The lower tilted surfaces (the first tilted surface 42 and the second tilted surfaces 43), which are tilted to the direction in which the second recessed part 40 becomes smaller toward the depth direction of the second recessed part 40, are formed on the peripheral edge of the second recessed part 40. The tilt angle of the upper tilted surface is steeper (more acute) than the tilt angle of each of the lower tilted surfaces.

As a result, the area of the sucked region that can be sucked by a suction nozzle of a mounter can be secured more sufficiently on the upper surface 12 of the core body 10.

As shown in FIG. 4, a width dimension W1 (for instance, a width dimension in the front-rear direction) of the upper end of the first planar part 51 is smaller than a width dimension W2 (for instance, a width dimension in the front-rear direction) of the lower end of the first planar part 51. Therefore, the joining process (attaching process) (caulking process) of the second planar part 52 can be performed easily.

Further, the dimension of the second planar part 52 is smaller than the dimension of the third planar part 53 in the radial direction of the coil component 100. Therefore, the area of the sucked region that can be sucked by the suction nozzle of the mounter can be secured more sufficiently on the upper surface 12 of the core body 10.

Further, the first protruding part 62 and the second protruding part 63 of the coil 60 protrude from the lower part of the core body 10. The first protruding part 62 and the second protruding part 63 are respectively electrically connected to each of the metal terminals 50 at the lower part of the coil component 100. Therefore, the distance between each of the first protruding part 62 and the second protruding part 63 and each of the third planar parts 53, which are mounting terminals, can be shorten. As a result, a direct current resistance (DCR) of the coil component 100 is decreased.

In addition, the first protruding part 62, the second protruding part 63, the first welding part 71, and the second welding part 72 are arranged at the lower part of the coil component 100. Therefore, since a position of a center of gravity of the coil component 100 can be more lowered, a vibration resistance of the coil component 100 can be improved.

Further, applications or uses of the coil component 100 are not particularly limited. However, for instance, the coil component 100 according to the embodiments of the present application can be used as an inductor assembled in a vehicle.

The embodiments of the coil component are explained with reference to the drawings. However, these embodiments are examples of the present invention. Thus, it will be apparent that the same may be varied in many ways.

The embodiments of the present application include the following technical ideas or technical concepts.

<1> A coil component including:

a core body formed of a magnetic material, the core body having:

a mounting surface;

an upper surface, the upper surface and the mounting surface being outwardly opposite to each other; and a first side surface joining the mounting surface and the upper surface;

a coil having:

an embedded part embedded in the core body; and a first protruding part protruding from the core body; and a first metal terminal electrically connected to the first protruding part of the coil, the first metal terminal having:

a first plate arranged along the first side surface of the core body;

a second plate continuously extending from an upper end of the first plate and arranged along the upper surface of the core body; and a third plate continuously extending from a lower end of the first plate and arranged along the mounting surface of the core body, wherein a leading edge of the second plate is recessed toward the upper end of the first plate to form a first arc-shaped part, the upper surface of the core body has a first recess in which the second plate is arranged, and the first recess has a second arc-shaped part at a portion facing the first arc-shaped part, and the second arc-shaped part extends along a contour of the first arc-shaped part.

<2> The coil component according to <1>, further including:

a second metal terminal having:

a fourth plate arranged along a second side surface of the core body;

a fifth plate continuously extending from an upper end of the fourth plate and arranged along the upper surface of the core body; and a sixth plate continuously extending from a lower end of the fourth plate and arranged along the mounting surface of the core body, wherein the second side surface of the core body joins the mounting surface and the upper surface, the coil has a second protruding part protruding from the core body, and the second metal terminal is electrically connected to the second protruding part, the upper surface of the core body has a second recess in which the fifth plate is arranged, a leading edge of the fifth plate is recessed toward the upper end of the fourth plate to form a third arc-shaped part, the second recess has a fourth arc-shaped part at a portion facing the third arc-shaped part, and the fourth arc-shaped part extends along a contour of the third arc-shaped part, and the second arc-shaped part of the first recess and the fourth arc-shaped part of the second recess extend along a same circumference of a circle (are concentrically arranged) on the upper surface of the core body in a plan view.

<3> The coil component according to <1> or <2>, wherein the mounting surface has a third recess in which the third plate of the first metal terminal is arranged.

<4> The coil component according to <3>, wherein the second plate of the first metal terminal is spaced apart from a bottom of the first recess via a first distance, the third plate of the first metal terminal contacts a bottom of the third recess or is spaced apart from the bottom of the third recess via a second distance, and the second distance is smaller than the first distance.

<5> The coil component according to <3> or <4>, wherein a first inner wall of the first recess is inwardly inclined by a first angle, and an area of a bottom of the first recess is smaller than an area of a top of the first recess, a second inner wall of the third recess is inwardly inclined by a second angle, and area of a bottom of the third recess is smaller than an area of a top of the third recess, and the first angle is more acute than the second angle.

<6> The coil component according to any one of <1>-<5>, wherein the first metal terminal further has:

a seventh plate continuously extending at an angle from a side edge of the first plate; and an eighth plate continuously extending at an angle from a leading edge of the seventh plate, the seventh plate extends along another side surface of the core body, and the eighth plate uprises with respect to the another side surface.

<7> The coil component according to <6>, further including:

a welded piece provided at a lower end part of the eighth plate of the first metal terminal, wherein the welded piece is welded to the first protruding part of the coil.

The coil component being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims. Further, the above embodiments can be combined with each other and such combinations are not to be regarded as a departure from the spirit and scope of the invention.

What is claimed is:

1. A coil component comprising:

a core body formed of a magnetic material, the core body having:

a mounting surface;

an upper surface, the upper surface and the mounting surface being outwardly opposite to each other; and a first side surface joining the mounting surface and the upper surface;

a coil having:

an embedded part embedded in the core body; and a first protruding part protruding from the core body; and a first metal terminal electrically connected to the first protruding part of the coil, the first metal terminal having:

a first plate arranged along the first side surface of the core body;

a second plate continuously extending from an upper end of the first plate and arranged along the upper surface of the core body; and a third plate continuously extending from a lower end of the first plate and arranged along the mounting surface of the core body, wherein a leading edge of the second plate is recessed toward the upper end of the first plate to form a first arc-shaped part, the upper surface of the core body has a first recess in which the second plate is arranged, and the first recess has a second arc-shaped part facing the first arc-shaped part, and the second arc-shaped part extends along a contour of the first arc-shaped part.

2. The coil component according to claim 1, further comprising:

a second metal terminal having:

a fourth plate arranged along a second side surface of the core body;

a fifth plate continuously extending from an upper end of the fourth plate and arranged along the upper surface of the core body; and a sixth plate continuously extending from a lower end of the fourth plate and arranged along the mounting surface of the core body, wherein the second side surface of the core body joins the mounting surface and the upper surface, the coil has a second protruding part protruding from the core body, and the second metal terminal is electrically connected to the second protruding part, the upper surface of the core body has a second recess in which the fifth plate is arranged, a leading edge of the fifth plate is recessed toward the upper end of the fourth plate to form a third arc-shaped part, the second recess has a fourth arc-shaped part facing the third arc-shaped part, and the fourth arc-shaped part extends along a contour of the third arc-shaped part, and the second arc-shaped part of the first recess and the fourth arc-shaped part of the second recess are concentrically arranged on the upper surface of the core body in a plan view.

3. The coil component according to claim 2, wherein the mounting surface has a third recess in which the third plate of the first metal terminal is arranged.

4. The coil component according to claim 3, wherein the second plate of the first metal terminal is spaced apart from a bottom of the first recess via a first distance, and the third plate of the first metal terminal contacts a bottom of the third recess or is spaced apart from the bottom of the third recess via a second distance, and the second distance is smaller than the first distance.

5. The coil component according to claim 3, wherein a first inner wall of the first recess is inwardly inclined by a first angle, and an area of a bottom of the first recess is smaller than an area of a top of the first recess, a second inner wall of the third recess is inwardly inclined by a second angle, and area of a bottom of the third recess is smaller than an area of a top of the third recess, and the first angle is more acute than the second angle.

6. The coil component according to claim 4, wherein a first inner wall of the first recess is inwardly inclined by a first angle, and an area of the bottom of the first recess is smaller than an area of a top of the first recess, a second inner wall of the third recess is inwardly inclined by a second angle, and area of the bottom of the third recess is smaller than an area of a top of the third recess, and the first angle is more acute than the second angle.

7. The coil component according to claim 2, wherein the first metal terminal further has:

a seventh plate continuously extending at an angle from a side edge of the first plate; and an eighth plate continuously extending at an angle from a leading edge of the seventh plate, the seventh plate extends along another side surface of the core body, and the eighth plate uprises with respect to the another side surface.

8. The coil component according to claim 7, further comprising:

a welded piece provided at a lower end part of the eighth plate of the first metal terminal, wherein the welded piece is welded to the first protruding part of the coil.

9. The coil component according to claim 1, wherein the mounting surface has a third recess in which the third plate of the first metal terminal is arranged.

10. The coil component according to claim 9, wherein the second plate of the first metal terminal is spaced apart from a bottom of the first recess via a first distance, and the third plate of the first metal terminal contacts a bottom of the third recess or is spaced apart from the bottom of the third recess via a second distance, and the second distance is smaller than the first distance.

11. The coil component according to claim 9, wherein a first inner wall of the first recess is inwardly inclined by a first angle, and an area of a bottom of the first recess is smaller than an area of a top of the first recess, a second inner wall of the third recess is inwardly inclined by a second angle, and area of a bottom of the third recess is smaller than an area of a top of the third recess, and the first angle is more acute than the second angle.

12. The coil component according to claim 10, wherein a first inner wall of the first recess is inwardly inclined by a first angle, and an area of the bottom of the first recess is smaller than an area of a top of the first recess, a second inner wall of the third recess is inwardly inclined by a second angle, and area of the bottom of the third recess is smaller than an area of a top of the third recess, and the first angle is more acute than the second angle.

13. The coil component according to claim 10, wherein the first metal terminal further has:

a seventh plate continuously extending at an angle from a side edge of the first plate; and an eighth plate continuously extending at an angle from a leading edge of the seventh plate, the seventh plate extends along another side surface of the core body, and the eighth plate uprises with respect to the another side surface.

14. The coil component according to claim 13, further comprising:

a welded piece provided at a lower end part of the eighth plate of the first metal terminal, wherein the welded piece is welded to the first protruding part of the coil.

15. The coil component according to claim 11, wherein the first metal terminal further has:

a seventh plate continuously extending at an angle from a side edge of the first plate; and an eighth plate continuously extending at an angle from a leading edge of the seventh plate, the seventh plate extends along another side surface of the core body, and the eighth plate uprises with respect to the another side surface.

16. The coil component according to claim 15, further comprising:

a welded piece provided at a lower end part of the eighth plate of the first metal terminal, wherein the welded piece is welded to the first protruding part of the coil.

17. The coil component according to claim 9, wherein the first metal terminal further has:

a seventh plate continuously extending at an angle from a side edge of the first plate; and an eighth plate continuously extending at an angle from a leading edge of the seventh plate, the seventh plate extends along another side surface of the core body, and the eighth plate uprises with respect to the another side surface.

18. The coil component according to claim 17, further comprising:

a welded piece provided at a lower end part of the eighth plate of the first metal terminal, wherein the welded piece is welded to the first protruding part of the coil.

19. The coil component according to claim 1, wherein the first metal terminal further has:

a seventh plate continuously extending at an angle from a side edge of the first plate; and an eighth plate continuously extending at an angle from a leading edge of the seventh plate, the seventh plate extends along another side surface of the core body, and the eighth plate uprises with respect to the another side surface.

20. The coil component according to claim 19, further comprising:

a welded piece provided at a lower end part of the eighth plate of the first metal terminal, wherein the welded piece is welded to the first protruding part of the coil.

* * * * *